United States Patent
Kremer et al.

[11] Patent Number: 6,092,634
[45] Date of Patent: Jul. 25, 2000

[54] COMPLIANT CAGE FOR A ROLLER-TYPE BI-DIRECTIONAL ONE-WAY CLUTCH MECHANISM

[75] Inventors: John M. Kremer, Sterling Heights, Mich.; David C. Choate, Chicago; James R. Quigley, Lombard, both of Ill.

[73] Assignee: BorgWarner Inc., Troy, Mich.

[21] Appl. No.: 09/265,143

[22] Filed: Mar. 8, 1999

[51] Int. Cl.[7] .................................................. F16D 41/067
[52] U.S. Cl. ................................ 192/38; 192/45; 384/526
[58] Field of Search ................................ 192/38, 45, 44; 384/526, 534, 576

[56] References Cited

U.S. PATENT DOCUMENTS

| | | |
|---|---|---|
| 3,731,774 | 5/1973 | Kitchin . |
| 3,737,015 | 6/1973 | Johnson et al. . |
| 3,993,176 | 11/1976 | Marola et al. ............................. 192/45 |
| 4,004,840 | 1/1977 | Johnston et al. ......................... 384/526 |
| 4,664,237 | 5/1987 | Lederman et al. . |
| 4,712,661 | 12/1987 | Lederman et al. . |
| 4,723,645 | 2/1988 | Rabe ........................................ 192/45 |
| 4,782,928 | 11/1988 | Lederman . |
| 4,821,857 | 4/1989 | Groh . |
| 4,848,508 | 7/1989 | Smirl et al. . |
| 4,850,462 | 7/1989 | Lederman . |
| 4,987,670 | 1/1991 | Papania . |
| 4,998,605 | 3/1991 | Ferris . |
| 5,033,878 | 7/1991 | Tsuji et al. .............................. 384/576 |
| 5,183,139 | 2/1993 | Malecha . |
| 5,195,604 | 3/1993 | Brockett et al. . |
| 5,275,261 | 1/1994 | Vranish . |
| 5,279,399 | 1/1994 | Riggle . |
| 5,279,400 | 1/1994 | Riggle et al. . |
| 5,307,911 | 5/1994 | Robinson . |
| 5,443,147 | 8/1995 | Gratzer ................................... 192/44 X |
| 5,526,911 | 6/1996 | Kinoshita . |
| 5,542,515 | 8/1996 | Richardson et al. . |
| 5,636,720 | 6/1997 | Lederman ................................. 192/45 |
| 5,957,592 | 9/1999 | Yamanaka ................................ 384/526 |

*Primary Examiner*—Rodney H. Bonck
*Attorney, Agent, or Firm*—Artz & Artz PC; Greg Dziegielewski

[57] ABSTRACT

A bi-directional one-way clutch mechanism with a compliant cage member. The clutch mechanism has a plurality of roller members positioned between inner and outer race members. A compliant cage member is also positioned between the race members and acts to hold the roller members in place and also to reduce the magnitude of loads applied to the roller members when the clutch mechanism is engaged. The roller members are positioned in windows in the cage members and integral spring-like leaf segments are positioned in each of the windows on either side of the roller members. One or two spring-like members, together with one or more recesses between each of the windows and roller members provide resiliency for the cage mechanism. The compliant cage device reduces the magnitude of the loads applied to the clutch mechanism and prevent fatigue fracture and premature failure of the cage device. In an alternate embodiment, a one-piece injection molded compliant cage mechanism is utilized with separate metal spring members for biasing the roller members.

8 Claims, 4 Drawing Sheets

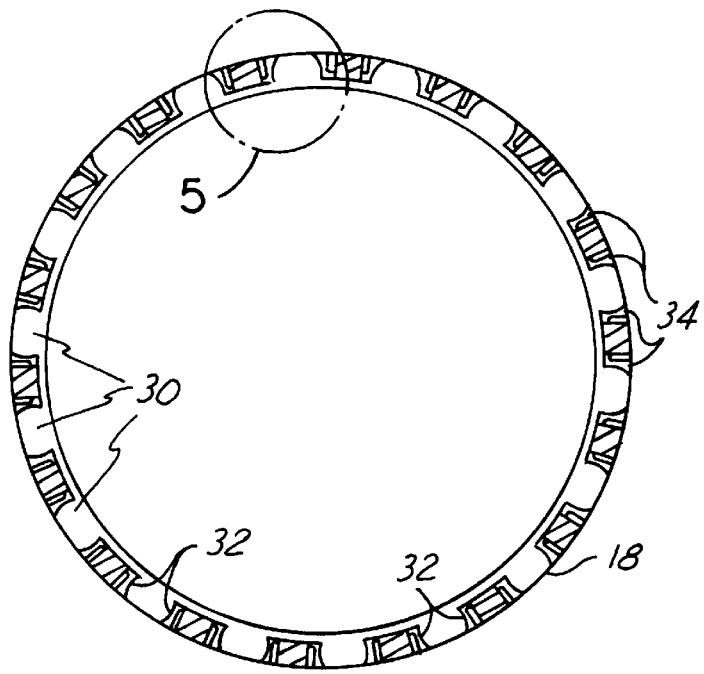
FIG. 4
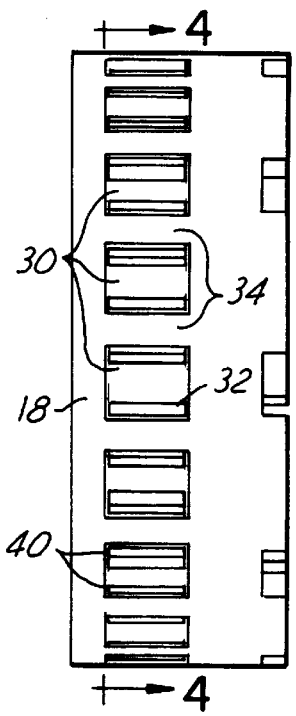
FIG. 3
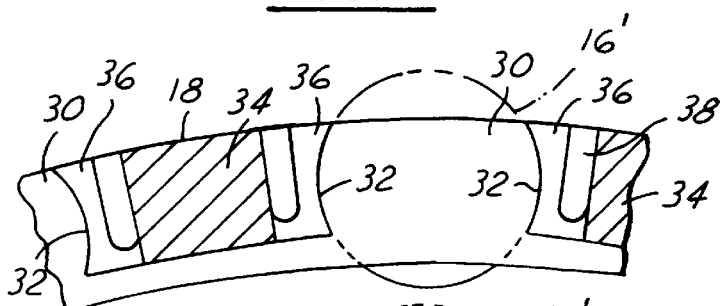
FIG. 5
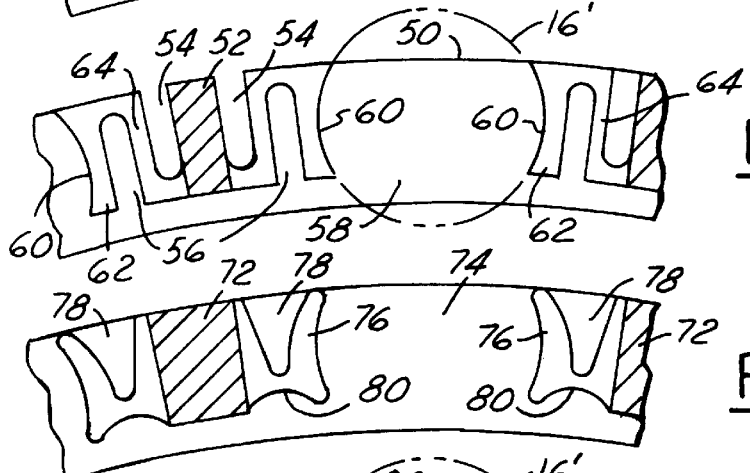
FIG. 6
FIG. 7
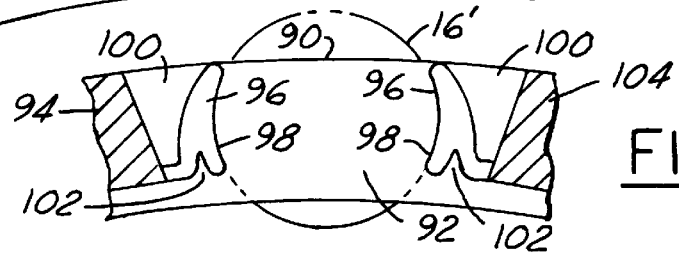
FIG. 8

COMPLIANT CAGE FOR A ROLLER-TYPE BI-DIRECTIONAL ONE-WAY CLUTCH MECHANISM

TECHNICAL FIELD

This invention relates to one-way roller-type clutch mechanisms and improved compliant cage devices therefor.

BACKGROUND OF THE INVENTION

There are many types of one-way roller clutch mechanisms—whether one directional or bi-directional—in use today. These roller clutch mechanisms have particular use in vehicle transfer case applications, although they also have use in many other applications, such as vehicle rear differentials, vehicle and machine transmissions, and other mechanical industrial applications utilizing rotating machinery. In transfer cases, the system provides transfer of torque from the driving wheels to the non-driving wheels whenever the driving wheels experience slippage.

In bi-directional roller clutch mechanisms, the outer surface of the inner race member typically has a wavy cam-type surface, with a roller member being positioned between each of the cams. In these clutch mechanisms, the rollers form a rocking wedge between the driven and drive shafts to drive the driven shaft in a selected direction. Many of these mechanisms are two-way devices and are generally relatively complicated in that some form of spring or shifting mechanism is required to change from a drive in one direction to a drive in the opposite direction.

Also, when the clutch mechanism engages, end loads are applied and the magnitude of the loads can be substantial. Even within normal tolerance ranges, slight differences between roller diameters, cam surfaces and roller travel distances can lead to fatigue of the cage mechanisms and/or premature failure of the cage or clutch mechanism.

A known one-way roller-type clutch mechanism is shown, for example, in co-owned U.S. Pat. No. 4,848,508. Other known clutch mechanisms are disclosed in U.S. Pat. Nos. 5,195,604, 5,307,911, 5,443,147, and 5,542,515.

SUMMARY OF THE INVENTION

It is an object of the present invention to provide an improved one-way cage mechanism for a clutch mechanism. It is another object of the present invention to provide an improved cage mechanism for a bi-directional one-way clutch mechanism.

It is a further object of the present invention to provide a cage mechanism for a clutch assembly which reduces magnitudes of loads in the clutch mechanism and minimizes fatigue and/or premature failure of the cage mechanism. It is a still further object of the present invention to provide a compliant cage mechanism for a clutch assembly which is more economical to manufacture.

The problems and disadvantages with known cage-type one-way roller clutch mechanisms are overcome with the present invention. The present invention provides a roller-type one-way clutch mechanism with an improved cage device, particularly for bi-directional use. The cage device preferably incorporates spring-like segments which provide resiliency for the clutch mechanism. When the clutch mechanism engages and loads are applied to it, differences in geometries from cam-to-cam and roller-to-roller will result in circumferential loading on the cage device. The resilient spring members reduce the magnitude of these loads and prevent fatigue fracture of the cage device and other premature failure.

The annular cage device has a plurality of pockets based around its circumference in which the roller members are positioned. The pocket members have curved side surfaces conforming to the shape of the roller members, as well as one or more recesses adjacent the side surfaces of the pocket members. In alternate embodiments, one, two or more recesses are provided adjacent at least one side surface of each pocket member. Also, for increased resiliency, spring-like members can be provided adjacent each side of each of the pocket members.

In another embodiment of the invention, the resilient cage is combined with a plurality of separate resilient spring members. The spring members are provided around the circumference of the cage member and positioned in contact with the roller members. The spring members provide the requisite resiliency for the clutch mechanism. The configuration and structure of the cage member facilitates ease of manufacture since it is designed to be made by an injection molding process with an axial pull operation.

These and other features, benefits, and advantages of the present invention will become apparent from the following description of the invention when viewed in accordance with the attached drawings and appended claims.

BRIEF DESCRIPTION OF THE DRAWINGS

FIG. 3 is a side view of the cage device shown in FIG. 2;

FIG. 4 is a cross-sectional view of the cage device shown in FIGS. 2 and 3, the cross-section being taken along line 4—4 in FIG. 3 and in the direction of the arrows;

FIG. 5 is an enlarged view of a portion of the cage device shown in FIG. 4;

FIGS. 6–10 illustrate alternate embodiments of cage devices in accordance with the present invention.

BEST MODE OF THE INVENTION

Figure 1:
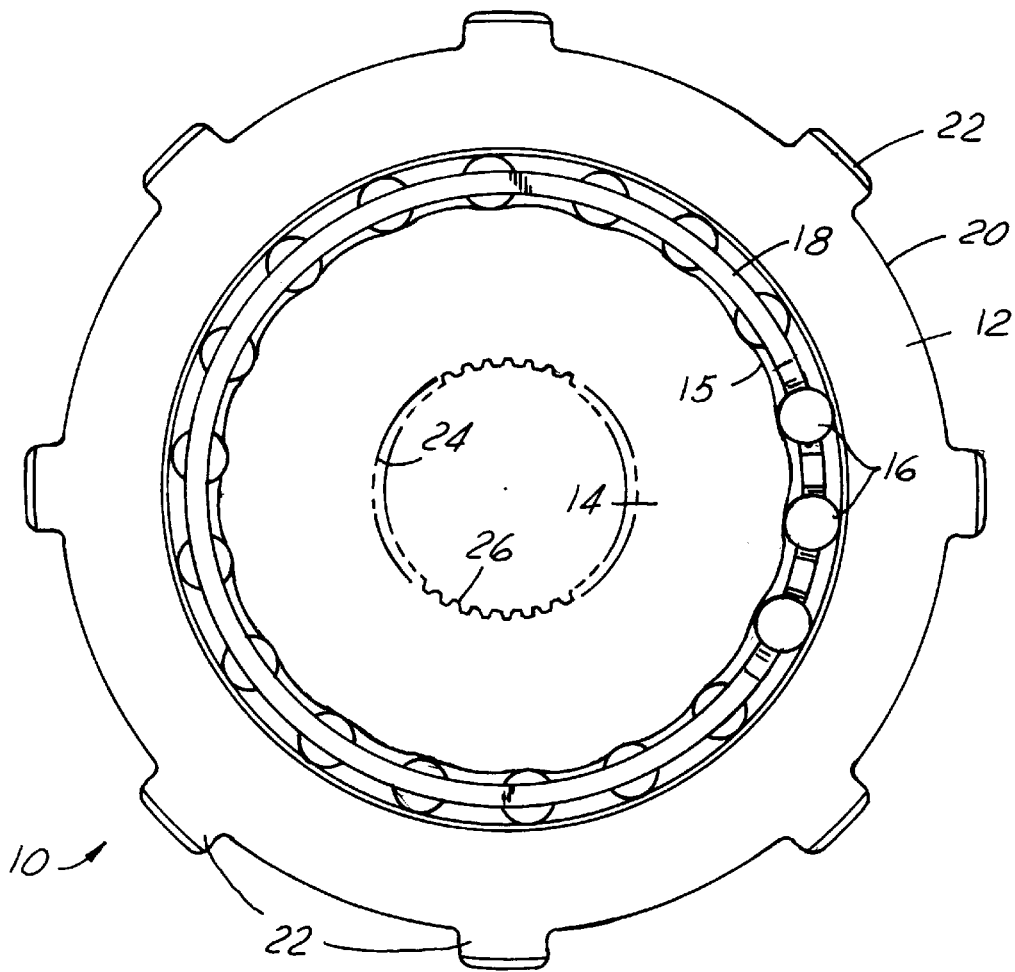
FIG. 1 illustrates a one-way clutch mechanism in accordance with the present invention.

As shown in FIG. 1, the clutch mechanism is generally referred to by the reference numeral 10. The clutch mechanism 10 includes an outer race member 12, an inner race member 14, a plurality of roller members 16 positioned in between the inner and outer race members, and a cage device or member 18. The outer surface of the inner race member 14 has a cam-type surface 15.

The present invention has a number of uses and applications and can be used, for example, in vehicle transfer case applications, vehicle rear differentials, vehicle and machine transmissions, and other industrial applications utilizing rotating machinery. One such use is shown, for example, in co-owned U.S. Pat. No. 4,848,508, the disclosure of which is hereby incorporated by reference herein.

In accordance with known clutch mechanisms, the outer surface 20 of the outer race member 12 can be provided with various interlocking, toothed or splined structures in order to mate with and drive part of the mechanical mechanism or structure in which the clutch mechanism is situated. In this regard, a plurality of spline or teeth members 22 are shown in FIG. 1.

Similarly, the inner surface 24 of the inner race member 14 can have a plurality of teeth members 26 or similar spline-type structures in order to be secured to a shaft or other member positioned inside the inner race member.

The roller members 16 can be of any conventional type, but preferably have a round cylindrical shape. The roller members are made from a metal material, such as high strength or hardened steel, and can be cut from a drawn wire of such material.

The cage device or member 18 which preferably is used with the present invention is shown in FIGS. 1–5. The cage member 18 has an annular or ring shape and is preferably made from a plastic material, such as nylon or a fiberglass reinforced engineering polymer. It is also possible, but not preferred, to make the cage member from a metal or similar material.

A plurality of cross-members 34 are provided around the circumference of the cage member 18 forming windows 30. The windows are positioned around the circumference of the cage member and each are adapted to have a roller member 16 positioned therein. Preferably, the windows are evenly spaced in order to maximize the load capacity of the clutch assembly.

The side surfaces 32 of each of the cross-members or windows 30 are curved to conform to the shape of the roller members 16. In this regard, a roller member 16' is shown in phantom lines in FIG. 5 positioned in one of the windows 30.

A pair of resilient spring-like members (or leaf segments) 36 are attached to each of the cross-members 34 and are adapted to come in contact with the outer surfaces of the roller members. Recesses or grooves 38 are provided between each of the resilient spring-like members 36 and the body of each of the cross-members 34. Grooves 38 provide clearance for the spring-like members 36 to be deformed when the roller members are placed under load.

Figure 2:
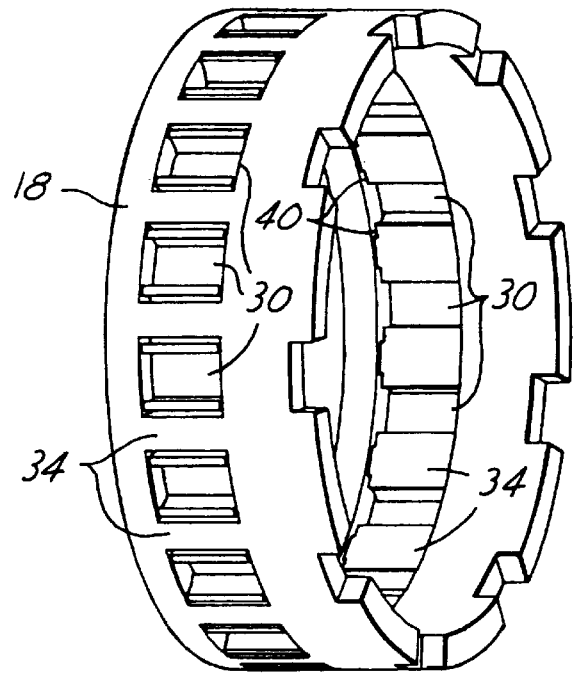
FIG. 2 is a perspective of a compliant cage device in accordance with the present invention.

The spring-like members 36 are not connected at their outer edges 40 (as shown in FIGS. 2 and 3). This allows the members 36 to deflect more easily without developing excessive loads. The spring members also accommodate any tolerance differences between the various members of the clutch mechanism. In this regard, slight differences in dimensions between roller diameters, cam-to-cam distances, roller travel distances on the cam surfaces, etc., can lead to unacceptable forces being applied to the cage device. These forces over time can lead to fatigue fracture of the cage devices and premature failure of the clutch mechanism.

The spring-like leaf members or segments 36 build resilience into the one-way clutch mechanism 10. When the clutch is engaged and loads are applied to the race members, any differences between the geometries from cam-to-cam on the outer surface 15 of the inner race member 14 and from roller-to-roller 16, will result in non-uniform circumferential loading on the cage member 18. The compliant leaf-segments 36 reduce the magnitude of those loads and prevent fatigue fracture of the cage material and other types of premature failure.

Other embodiments of compliant cage devices or members in accordance with the present invention are shown in FIGS. 6–10. In FIG. 6, the compliant cage member 50 has smaller cross member body portions 52 and pairs of recesses 54 and 56 positioned between each window 58 where the roller members 16' are positioned. Each of the windows have curved side surfaces 60 thereon and a pair of spring-like members 62 and 64 formed by the recesses. The pair of spring-like leaf members 62 and 64 provide additional resiliency and ability to reduce the magnitude of loads applied to the clutch mechanism.

FIG. 7 shows still another cage device or member 70 with cross members 72, a plurality of windows 74, and a plurality of spring-like leaf members 76 positioned adjacent each window. The spring members 76 have recesses 78 formed between them and the body portions of the cross members 72. The spring members 76 also have shallow concave lower surfaces 80 which allow the spring-like member 76 to bend more easily and thus more easily absorb more of the loads in the clutch mechanism 10 during engagement.

A further compliant cage member 90 is shown in FIG. 8. The cage member 90 has a plurality of windows 92, a plurality of cross members 94 positioned between each of the windows, and a plurality of spring-like members 96 with curved surfaces 98 positioned on either side of the roller members (shown in phantom by reference numeral 16'). Recesses 100 are provided adjacent each of the spring-members 96, and second smaller recesses 102 are provided which help provide added resiliency to the cage device. The recesses 102 are provided in the spring members 96 and allow the spring members to be more flexible.

Figure 9:
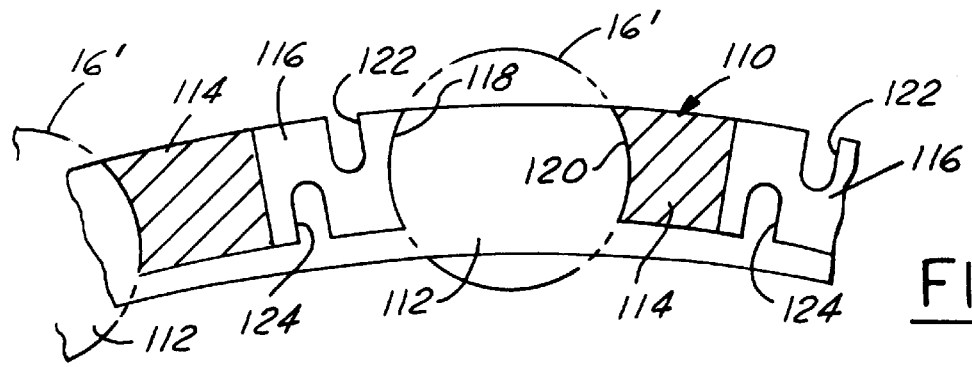
Figure 10:
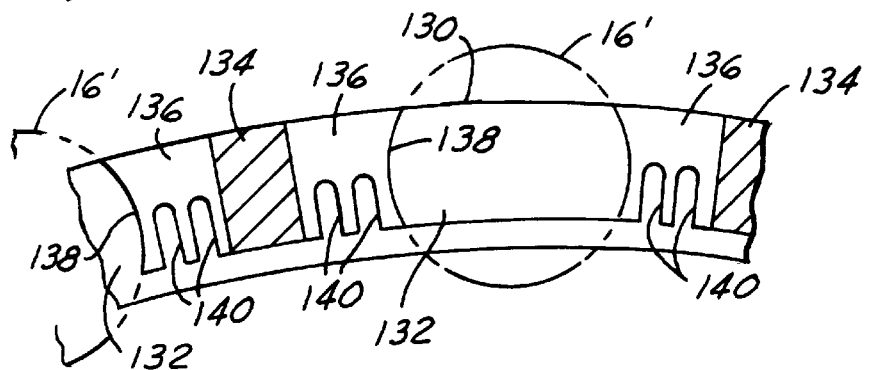

FIGS. 9 and 10 show still additional embodiments of the invention. In FIG. 9, the compliant cage member 110 has a plurality of windows 112, cross-members 114 and spring members 116. One spring member is positioned between each of the rollers 16' and only on one side thereof. The spring members 116 have curved surfaces 118 which mate with one side of the rollers 16', while the cross-members 114 have the other curved surface 120. A pair of recesses 122, 124 are provided in each of the spring members 116, with one of the recesses 122 opening radially outwardly, while the other recess 124 opens radially inwardly.

In FIG. 10, the compliant cage member 130 has a plurality of windows 132, a plurality of cross-members 134, and a plurality of spring-like members 136. One of the spring-like members 136 is positioned on either side of each of the rollers 16', and the spring-like members each have a curved surface 138 for mating with the curvature of a roller and nesting it between two adjacent spring-like members. In order to have sufficient resiliency, each of the spring-like members have a pair of recesses 140. In this embodiment, the recesses are positioned to open radially inwardly in the cage member.

Figure 11:
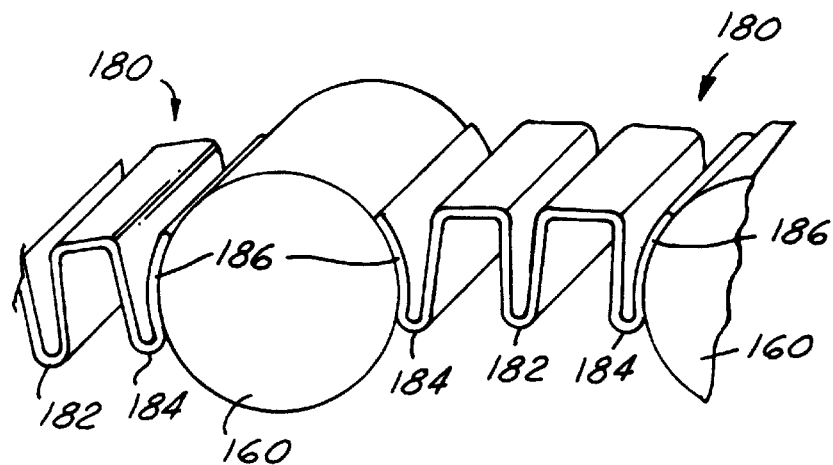
FIGS. 11, 12, 12A, and 13–15 illustrate another embodiment of the invention (and components thereof) in which a resilient spring member is utilized in combination with a compliant cage member injection molded by an axial pull procedure.
Figure 12:
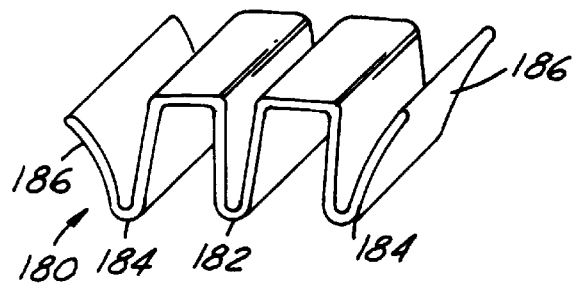
Figure 13:
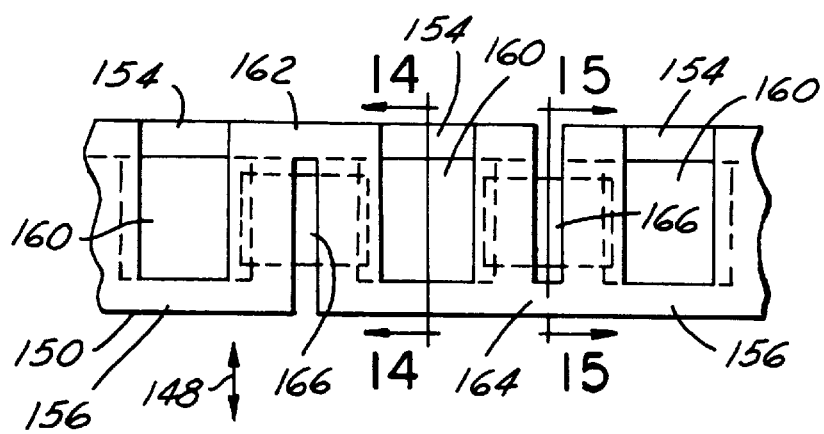

FIGS. 11–15 illustrate another embodiment of the invention in which the cage member is made in one piece by a straight pull or axial pull injection molding process and separate resilient spring members are utilized. (The axial pull direction is shown by the arrow 148). The cage member is shown in FIG. 13 and designated by the reference numeral 150. The separate spring members 180 are shown in FIGS. 11 and 12.

Figure 14:
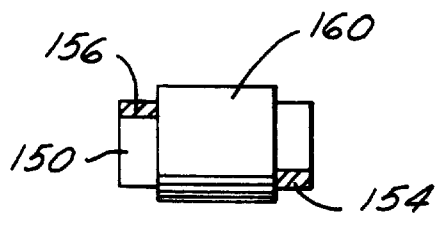
Figure 15:
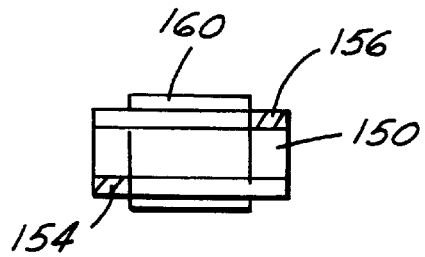

Two cross-sectional views of the cage member 150 are shown in FIGS. 14 and 15. The cage member has a plurality of openings 152 evenly spaced around its periphery. Roller members 160 are positioned in each of the openings when the clutch mechanism is assembled. Radially staggered support members 154 and 156 are provided on the two sides or ends of each of the openings 152 in order to hold the roller members 160 axially in place. Axially staggered support members 162 and 164 are positioned between each of the roller openings. Adjacent each of the support members 162 and 164 are slots or openings 166 which are used for placement of the separate spring members 180 (shown in FIGS. 11 and 12).

Figure 12A:
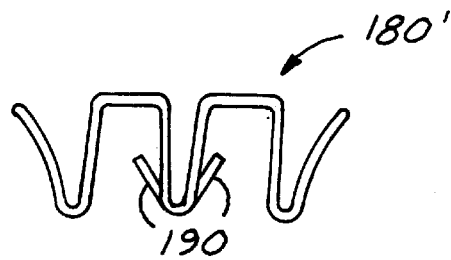

The spring members 180, which preferably are made of spring steel or a similar material, are positioned on the cage member 150 with center portions 182 situated in openings 166 and with the two end portions 184 positioned in adjacent roller openings 152. The spring members have leaf-spring elements 186 at either end which are used to bias the roller members 160. If needed to help secure the spring members 180 to the cage member 150, a plurality of tabs or barbs 190 can be provided on the spring members, such as shown in FIG. 12A. The barbs 190 will dig into the material forming the cage member and keep the spring members securely positioned on the cage member.

The slots 160 could alternatively be provided on the same axial side of the cage member. With this embodiment, the spring members 180 could be assembled on the cage member by axially sliding the spring members onto the cage member.

The above objects and other objects, features, and advantages of the present invention are readily apparent from the following detailed description of the best mode for carrying out the invention when taken in connection with the accompanying drawings.

What is claimed is:

1. A roller clutch mechanism comprising:

an inner race member and an outer race member;

an annular cage member positioned between said inner and outer race members, said cage member having a plurality of cross-members forming pockets spaced around the circumference thereof;

a plurality of roller members, one of said roller members positioned in each of said pockets;

said cross-members having curved side surfaces in said pockets conforming to the shape of said roller members; and a plurality of recesses in said cross-members;

at least two of said recesses positioned adjacent each of said side surfaces for providing resilience relative to the positioning and movement of said roller members in said pockets;

one of said two recesses opening radially outwardly and the other of said two recesses opening radially inwardly.

2. The clutch mechanisms of claim 1 wherein at least two of said recesses are positioned immediately adjacent each circumferential side of each of said pockets.

3. The clutch mechanism of claim 2 wherein resilient spring-like members are formed adjacent each side of each of said pockets between said side surfaces and said recesses.

4. The clutch mechanism of claim 3 wherein two resilient spring-like members are formed adjacent each side of each of said pockets.

5. A compliant cage member for a roller clutch mechanism, said clutch mechanism having an inner race member, an outer race member and a plurality of roller members positioned in between said inner and outer race members, said cage member comprising:

an annular ring member of a resilient material, said ring member adapted to be positioned between said inner and outer race members;

said ring member having a plurality of cross-members forming windows positioned uniformly around the circumference, each of said cross-members having curved side surfaces conforming to the shape of said roller members and being adapted to receive one of said roller members therein; and said ring member having a plurality of recesses, at least two of said recesses being positioned adjacent each of said side surfaces;

one of said two recesses opening radially outwardly and the other of said two recesses opening radially inwardly.

6. The compliant cage member of claim 5 wherein two recesses are positioned immediately adjacent each circumferential side of each of said windows.

7. The compliant cage member of claim 6 wherein resilient spring-like members are formed adjacent each side of each of said windows between said side surfaces and said recesses.

8. The compliant cage member of claim 7 wherein two resilient spring-like members are formed adjacent each side of said windows.

* * * * *